Aug. 25, 1936. F. C. DU GRENIER Re. 20,077
COIN CONTROLLED DISPENSER
Original Filed Nov. 5, 1935
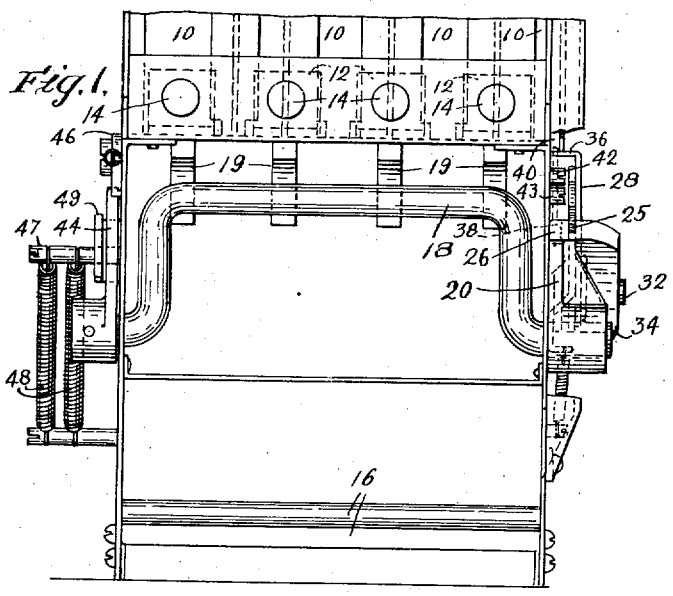
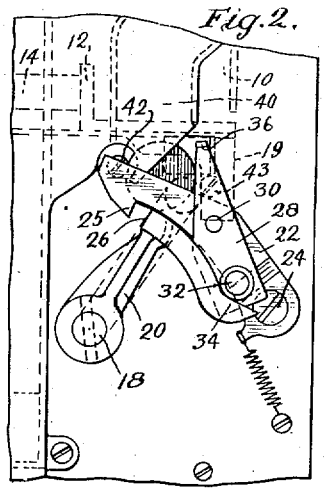
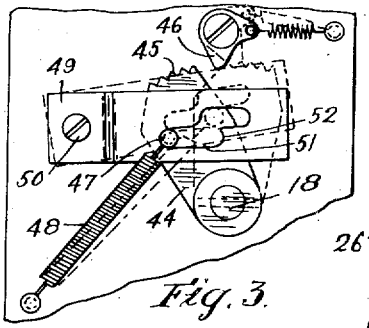
Fig. 3.
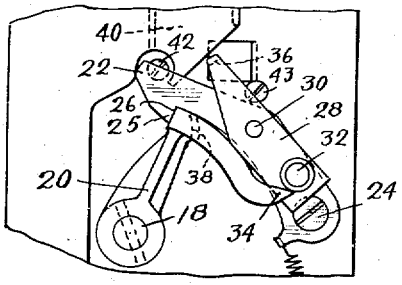
Fig. 4.
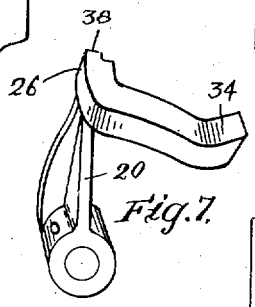
Fig. 7.
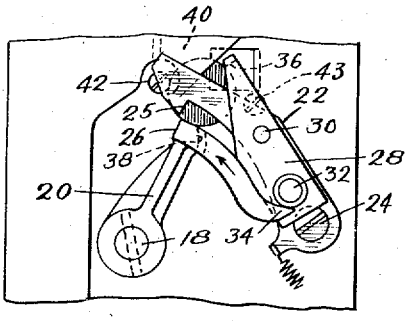
Fig. 5.
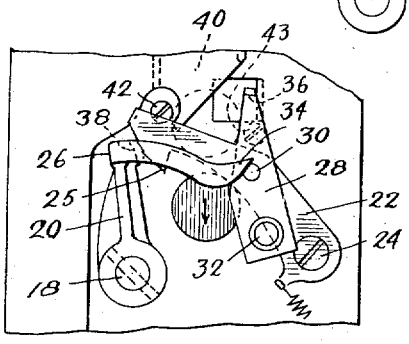
Fig. 6.
Inventor.
Francis C. Du Grenier
by S. H. Hamilton
Atty.

Reissued Aug. 25, 1936

Re. 20,077

UNITED STATES PATENT OFFICE 20,077

COIN CONTROLLED DISPENSER

Francis C. Du Grenier, Haverhill, Mass., assignor of one-half to Blanche E. Bouchard, Haverhill, Mass.

Original No. 2,037,463, dated April 14, 1936, Serial No. 48,270, November 5, 1935. Application for reissue June 11, 1936, Serial No. 84,733

8 Claims. (Cl. 194—71)

This invention relates to coin-controlled mechanism for releasing the locking mechanism of a dispensing apparatus, to permit the dispensing operation to be performed.

The primary object of the invention is to provide a simplified form of coin controlled releasing means which will be composed of a minimum number of parts and may therefore be produced at small expense, and which will also be durable and unlikely to get out of order after a long period of use.

This and other objects of the invention are accomplished by means of the construction hereinafter disclosed by the following specification and as illustrated in the accompanying drawing in which:

Fig. 1 is a view in front elevation of the lower portion of a dispensing machine provided with an embodiment of my invention.

Fig. 2 is a view thereof in elevation of a portion of the right hand end of the machine.

Fig. 3 is a similar view of the left hand end thereof.

Figs. 4, 5 and 6 are detail views of the coin controlled locking and releasing mechanism which is employed, showing the parts in different positions.

Fig. 7 is a detail view in perspective of the operating arm.

The machine illustrated is of the common type, in which a series of vertical package containing compartments 10 are provided, at the bottom of each of which is a reciprocating ejector 12, which is operated by a handle 14, the dispensing operation being performed by merely pulling out the handle and permitting it to return to initial position by the action of a spring and a package being removed from the bottom of the stack of packages in the compartment on the return movement and delivered to a tray 16. A crank shaft 18 is pivoted at its ends in the sides of the casing and extends beneath the ejectors in position to be engaged by a hook 19, which depends from each ejector, so that, when any one of the ejectors is pulled outward, the crank shaft is oscillated.

According to my invention, an angular shaped arm 20, shown in detail in Fig. 7 is secured to the right hand end of the shaft 18, so that when the shaft is moved rotatably in its bearings, on any one of the ejectors being pulled out, the arm 20 will be swung therewith. A locking dog 22 is mounted on a pivot 24 and is provided with a hook 25 arranged to engage a shoulder 26 on arm 20, so that, unless the dog 22 is lifted from its position shown in Fig. 2, after a slight movement of the arm 20 by the dispensing mechanism, the arm will be locked against further movement, as shown in Fig. 4.

A releasing lever 28, is mounted on a pivot 30 fixed in the middle portion of the dog 22, said lever having a pin 32 projecting from one end, which, in the initial position of the parts, is held in engagement with the end portion 34 of arm 20, and having a rigid finger 36, which extends from the opposite end thereof at right angles, see Fig. 1. A coin support 38 is formed integrally with the arm 20 and projects right angularly therefrom directly beneath the finger 36. A coin passage 40 opens at its lower end to the support 38, and studs 42, 43 are fixed in the casing at each side of said passage directly above said support, so that, when a coin is delivered to said passage it becomes lodged on said support and is held in position therein by said pins, as indicated in Fig. 2.

With the above described arrangement, if no coin has been delivered to support 38, when the arm 20 is swung upward by the action of the crank arm 18 thereon, it will merely swing the lever 28 on its pivot 30 and the arm will immediately be locked by the dog 22 against further movement, as shown in Fig. 4.

If, however, a coin has come to rest on support 38, as shown in Fig. 2, the finger 36, on said lever 28, will immediately be swung into engagement with the edge of the coin, so that further swinging movement of finger 36 is prevented, and on further movement of arm 20, its end portion 34 will be forced upward against pin 32, causing the lever 28 to swing on its finger 36 as a fulcrum.

As a result the pivot 30 of lever 28 will be forced upward, causing the dog 22 to be swung upward on its pivot 24 to the position of Fig. 5, so that it is lifted out of position to engage the shoulder 26, thereby permitting complete operation of the dispensing mechanism, as shown in Fig. 6. As the arm 20 moves beyond the position in which it can be locked by the dog 22, the coin support 38 carried by said arm will be moved from beneath the coin, which will then be free to fall into the money box, (not shown), as indicated in Fig. 6.

At times attempts are made to operate the dispensing mechanism so rapidly, by pulling out and pushing back an operating handle so quickly that the coin does not have time to fall from the coin support, before the support is moved back beneath the coin, so that the dispensing mechanism could then be operated a second time without inserting an additional coin.

To prevent the machine from thus being defrauded the attachment shown in Fig. 3 is provided. An arm 44 is secured on the left hand end of the crank shaft 18, and is conveniently provided with ratchet teeth 45, which are engaged by a pawl 46, so that when the dispensing operation is once started it must be completed. A rigid pin 47 is fixed in arm 44 and the return spring 48, is conveniently attached thereto. A dog 49 is loosely mounted on a pivot 50 and has a longitudinally extending slot 51 therein, comprising two portions disposed horizontally at different elevations and having an intermediate shoulder 52 at the front end of the lower slot portion. The pin 47 extends through said slot, so that the dog 49 is supported in a nearly horizontal position thereby. In the normal, or starting position of the parts, the pin 47 is located in the rear end of the slot 51, as shown in full lines in Fig. 3. If the dispensing mechanism is operated at normal speed, the pin 47 is moved forward in slot 51, and when the pin nearly reaches the point where it would engage the shoulder 52, the dog swings down so that the pin passes into the uppermost or front portion of the slot, the dog 49 thus in no way affecting the operation.

If, however, it is attempted to pull out a handle 14 too rapidly, the pin 47 will engage the shoulder 52 before the dog has time to swing down, as indicated by the dotted line position of Fig. 3, and as a result the dispensing movement will be arrested, so that it will be necessary for the operator to push inward on the handle to a slight extent, before the operation can be completed.

As soon as this is done the dog 49 will swing down, so that the shoulder 52 will be disengaged from the pin 47, thereby permitting it to pass into the front portion of the slot, so that the dispensing operation may be completed.

The arrangement is such that the coin support 38 will be moved from beneath the coin at the instant the pin 47 engages the shoulder 52, so that it will fall into the money box, and consequently, it will be necessary to insert another coin before the dispensing operation can again be performed.

It is to be noted that, while the device 49, which regulates the speed at which the machine may be operated to perform the dispensing operation, may be advantageously employed in connection with the type of machine herein shown and described, in which the dispensing mechanism is normally locked and cannot be unlocked without inserting a coin, it may also be advantageously employed in connection with a machine of the type shown in my Patent No. 2,040,983, dated May 19th, 1936, in which the dispensing mechanism is normally unlocked, but becomes locked after a short initial movement, if a coin has not been inserted, as the speed regulating device then permits the locking mechanism to function.

I claim:

1. In a coin controlled dispensing mechanism, having an operating device, a locking device normally operative to prevent operative movement of said operating device, a coin support to which coins are delivered, a releasing device pivotally mounted on said locking device, means arranged to be actuated on operative movement of said operating device to swing said releasing device on its pivot, and coin engaging means on said releasing device arranged to be engaged with a coin on said support, when said releasing device is swung on its pivot, to swing said releasing device on its said coin engaging means as a fulcrum and thereby hold said locking device in an inoperative position.

2. In a coin controlled dispensing mechanism, having an operating device, a locking device normally disposed in position to lock said operating device against operative movement, a coin support to which coins are delivered, a releasing device pivotally mounted on said locking device, means arranged to be actuated on an initial movement of said operating device to swing said releasing device on its pivot, and coin-engaging means on said releasing device arranged to be engaged with a coin on said support, when said releasing device is swung on its pivot, to swing said releasing device on its said coin engaging means as a fulcrum and thereby move said locking device to an inoperative position, to permit operative movement of said operating device.

3. In a coin-controlled dispensing mechanism, having an operating device, a locking device normally disposed in position to lock said operating device against operative movement, a coin support to which coins are delivered, a releasing device pivotally mounted on said locking device, means, arranged to be actuated by an initial movement of said operating device, to engage said releasing device at one side of its pivot, and swing the same thereon, and coin-engaging means on said releasing device at the opposite side of its pivot arranged to engage a coin held on said support, thereby to swing said releasing device on said coin engaging means as a fulcrum and move said locking device to an inoperative position.

4. In a coin-controlled dispensing mechanism, having an operating device, a locking device normally disposed in position to lock said operating device against operative movement, a coin support to which coins are delivered, a releasing device pivotally mounted on said locking device, at an intermediate point therein, means arranged to be actuated by an initial movement of said operating device at one end and swing the same on its pivot, means on the opposite end of said releasing device arranged to engage a coin on said support and provide a fulcrum for said releasing device, whereby, on further movement of said operating device, said releasing device will be swung about said fulcrum and thereby move said locking device to an inoperative position.

5. In a coin-controlled dispensing mechanism, operating devices arranged to be moved from and arm thereon arranged to be swung through a predetermined arc on operative movement thereof, a coin support on said arm to which a coin is delivered, a dog normally disposed to engage said arm and lock the same against operative movement, a releasing lever pivotally mounted on said dog and arranged for engagement at one end by said arm on initial operative movement thereof, to swing said lever on its pivot, means on the opposite end of said lever arranged to engage a coin on said support when swung by said arm, whereby, on further operative movement of the arm, said lever will be swung on its coin engaging end as a fulcrum and swing said dog into an inoperative position.

6. In a coin-controlled dispensing mechanism, operating devices arranged to be moved from and returned to an initial position to perform a dispensing operation, locking means therefor, coin controlled releasing means for said locking means including a coin support to which a coin is delivered, means for moving said support by said operating devices, when moved from initial position, to discharge a coin from said support, a regulating device for said operating devices comprising a pivotally mounted latch, having a slot therein composed of two connected portions disposed horizontally at different elevations and providing an intermediate shoulder at the end of the lowermost slot portion, a pin extending into said slot, and means for moving said pin and latch relatively by said operating devices when moved from initial position, to permit engagement of said pin and shoulder and arresting of said operating movement when the movement is at a higher rate of speed than normal and permitting the latch to swing downward when the movement is at normal speed, so that the pin and shoulder will not be engaged and the movement will not be arrested and discharge of the coin from said support will be permitted.

7. In a coin-controlled dispensing mechanism, operating devices arranged to be moved from and returned to an initial position to perform a dispensing operation, locking means therefor, coin controlled releasing means for said locking means, a regulating device for said operating devices comprising a pivotally mounted latch, having a slot therein composed of two connected portions disposed horizontally at different elevations and providing an intermediate shoulder at the end of the lowermost slot portion, a pin extending into said slot, and means for moving said pin and latch relatively by said operating devices when moved from initial position, to permit engagement of said pin and shoulder and arresting of said operating movement, when the movement is at a higher rate of speed than normal and permitting the latch to swing downward when the movement is at normal speed, so that the pin and shoulder will not be engaged and the movement will not be arrested.

8. In a coin-controlled dispensing mechanism, in combination with operating devices arranged to be moved from and returned to an initial position to perform a dispensing operation, locking means therefor, coin-controlled releasing means for said locking means including a coin support to which a coin is delivered and means controlled by said operating devices to discharge a coin from said support; a regulating device comprising a pivoted latch having a slot therein with a shoulder formed on one side, said latch being so mounted that it is urged to pivot towards the side having said shoulder, a pin extending into such slot, and means operated by said operating devices for causing a relative movement to take place between said pin and said latch such that when the relative movement of the pin along said slot is caused to occur at a speed resulting from normal operation of one of the said operating devices, the latch will turn on its pivot to permit the pin to move past said shoulder, whereas at a higher rate of relative speed of the pin along said slot such pivoting of the latch will not occur and the pin will engage said shoulder and arrest the operating movement.

FRANCIS C. DU GRENIER.